United States Patent
Miyashita (10) Patent No.: US 11,638,343 B2
(45) Date of Patent: Apr. 25, 2023

(54) LAMP CONTROL MODULE, VEHICLE LAMP, AND SIGNAL PROCESSING DEVICE

(71) Applicant: KOITO MANUFACTURING CO., LTD., Tokyo (JP)

(72) Inventor: Yuichi Miyashita, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/469,878

(22) Filed: Sep. 9, 2021

(65) Prior Publication Data

US 2022/0086992 A1 Mar. 17, 2022

(30) Foreign Application Priority Data

Sep. 16, 2020 (JP) .............................. JP2020-155751

(51) Int. Cl.
| | | |
|---|---|---|
| *H05B 47/155* | (2020.01) | |
| *B60Q 1/14* | (2006.01) | |
| *B60Q 1/48* | (2006.01) | |
| *B60Q 1/34* | (2006.01) | |
| *H05B 45/10* | (2020.01) | |
| *H05B 45/30* | (2020.01) | |

(52) U.S. Cl.
CPC ......... *H05B 47/155* (2020.01); *B60Q 1/1423* (2013.01); *B60Q 1/34* (2013.01); *B60Q 1/48* (2013.01); *B60Q 2400/30* (2013.01); *H05B 45/10* (2020.01); *H05B 45/30* (2020.01)

(58) Field of Classification Search
CPC ...... H05B 45/10; H05B 45/30; H05B 47/155; B60Q 1/1423; B60Q 1/34; B60Q 1/48; B60Q 2400/30
See application file for complete search history.

(56) References Cited

U.S. PATENT DOCUMENTS

| | | | | |
|---|---|---|---|---|
| 2005/0219851 | A1* | 10/2005 | Takeda ................... | B60Q 1/486 |
| | | | | 362/464 |
| 2013/0049585 | A1* | 2/2013 | Wu .......................... | B60Q 1/28 |
| | | | | 315/80 |
| 2022/0065418 | A1* | 3/2022 | Lee ........................ | F21S 41/285 |

FOREIGN PATENT DOCUMENTS

| | | | | | |
|---|---|---|---|---|---|
| CN | 109334558 | A | * | 2/2019 | |
| CN | 209390417 | U | * | 9/2019 | |
| CN | 215222545 | U | * | 12/2021 | |
| JP | 2019-057468 | A | | 4/2019 | |
| JP | 2019125593 | A | * | 7/2019 | ........... B60Q 1/0047 |
| JP | 2020059430 | A | * | 4/2020 | |

* cited by examiner

*Primary Examiner* — Abdullah A Riyami
*Assistant Examiner* — Syed M Kaiser
(74) *Attorney, Agent, or Firm* — Venjuris, P.C.

(57) ABSTRACT

A vehicle lamp includes a turn signal lamp, a daytime running lamp, and a position lamp. A first driving circuit drives a first light source that is the turn signal lamp. A second driving circuit drives a second light source that serves as both the daytime running lamp and the position lamp. A signal processing device executes a software program to control the first driving circuit and the second driving circuit based on the turn synchronization signal, the first switch-on request, and the second switch-on request.

13 Claims, 4 Drawing Sheets

| INPUT | | | | OUTPUT |
|---|---|---|---|---|
| REC_TURN | TURN_SYNC | REQ_POS | REQ_DRL | DRL/POS OUTPUT TABLE |
| DURING NON-BLINKING L | OFF | OFF | OFF | VAL1 |
| | | OFF | ON | VAL2 |
| | | ON | OFF | VAL3 |
| | | ON | ON | VAL4 |
| DURING BLINKING H | OFF | OFF | OFF | VAL5 |
| | | OFF | ON | VAL6 |
| | | ON | OFF | VAL7 |
| | | ON | ON | VAL8 |
| | ON | OFF | OFF | VAL9 |
| | | OFF | ON | VAL10 |
| | | ON | OFF | VAL11 |
| | | ON | ON | VAL12 |

FIG. 4

| OUTPUT TABLE | OPTICAL SYSTEM 1 | | OPTICAL SYSTEM 2 | |
|---|---|---|---|---|
| | US | COUNTRIES OTHER THAN US | US | COUNTRIES OTHER THAN US |
| VAL1 | OFF | OFF | OFF | OFF |
| VAL2 | DRL | DRL | DRL | DRL |
| VAL3 | POS | POS | POS | POS |
| VAL4 | DRL | POS | DRL | POS |
| VAL5 | OFF | OFF | OFF | OFF |
| VAL6 | OFF | POS | OFF | OFF |
| VAL7 | POS | POS | POS | OFF |
| VAL8 | POS | POS | OFF | OFF |
| VAL9 | OFF | OFF | OFF | OFF |
| VAL10 | OFF | POS | OFF | OFF |
| VAL11 | POS | POS | OFF | OFF |
| VAL12 | POS | POS | OFF | OFF |
| | SETTING EXAMPLE 1 | SETTING EXAMPLE 2 | SETTING EXAMPLE 3 | SETTING EXAMPLE 4 |

LAMP CONTROL MODULE, VEHICLE LAMP, AND SIGNAL PROCESSING DEVICE

CROSS-REFERENCE TO RELATED APPLICATIONS

This application is based on and claims priority from Japanese Patent Application No. 2020-155751, filed on Sep. 16, 2020, with the Japan Patent Office, the disclosure of which is incorporated herein in its entirety by reference.

TECHNICAL FIELD

The present disclosure relates to a lamp used for vehicles such as automobiles.

BACKGROUND

The function of a vehicle lamp has been highly improved in recent years. As a headlamp, multiple lamps having different functions are installed, such as a low beam, a high beam, a turn signal lamp, a position lamp, and a daytime running lamp, and it is necessary to make the light sources of the multiple lamps emit light with an appropriate luminance according to a control signal from a vehicle. See, e.g., Japanese Patent Laid-Open Publication No. 2019-057468.

SUMMARY

There is a case where the daytime running lamp and the position lamp share a light source. In this case, when an instruction is made to switch on only the daytime running lamp, the light source may be switched on to be bright, and when an instruction is made to switch on only the position lamp, the light source may be switched on to be relatively less bright. Meanwhile, when instructions to switch on the daytime running lamp and the position lamp are made at the same time, an adjustment control is necessary.

The present disclosure has been made in view of the problem described above, and an object of an aspect of the present disclosure is to provide a lamp control module capable of collectively controlling a plurality of modules, a vehicle lamp, and a signal processing device.

An aspect of the present disclosure relates to a lamp control module used for a vehicle lamp provided with a turn signal lamp, a daytime running lamp, and a position lamp. The lamp control module includes: a first driving circuit configured to drive a first light source that is the turn signal lamp; a second driving circuit configured to drive a second light source that serves as both the daytime running lamp and the position lamp; an input interface circuit configured to receive a turn synchronization signal for instructing a blinking of the turn signal lamp; a bus interface circuit configured to receive a first switch-on request for instructing switch-on/off of the daytime running lamp and a second switch-on request for instructing switch-on/off of the position lamp; and a signal processing device configured to execute a software program to control the first driving circuit and the second driving circuit based on the turn synchronization signal, the first switch-on request, and the second switch-on request.

Another aspect of the present disclosure relates to a signal processing device. The signal processing device is used for a vehicle lamp provided with a turn signal lamp, a daytime running lamp, and a position lamp. The turn signal lamp includes a first light source, and the daytime running lamp and the position lamp share a second light source. The signal processing device executes a software program to perform Processes I to III below.

Process I. Generate a turn switch-on request that becomes a first level in a blinking instruction state where the turn synchronization signal is a pulse form, and becomes a second level in a switch-off instruction state where a level of the turn synchronization signal is fixed.

Process II. Control a state of the first light source based on a turn synchronization signal for instructing a blinking of the turn signal lamp.

Process III. Control a state of the second light source based on the turn switch-on request, a first switch-on request for instructing switch-on/off of the daytime running lamp, and a second switch-on request for instructing switch-on/off of the position lamp.

Process III of controlling the state of the second light source is performed based on a table in which the turn switch-on request, the turn synchronization signal, the first switch-on request, and the second switch-on request are inputs, and a state of the second light source is an output.

In addition, arbitrary combinations of the above-described components, or substitutes of the components or expressions of the present disclosure in a method, an apparatus, a system or the like are also effective as aspects of the present disclosure.

According to an aspect of the present disclosure, it is possible to collectively control a plurality of lamps.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Outline of Embodiments

The outline of some embodiments of the present disclosure will be described. The outline is an introduction of the detailed descriptions herein below for facilitating the understanding of the embodiments of the present disclosure, and briefly describes the concept of one or some of plural embodiments without limiting the scope of the present disclosure. Further, the outline is not the comprehensive outline of all conceivable embodiments, and does not limit required components of the embodiments. For the convenience of descriptions, "an embodiment" may be used to indicate one or more embodiments disclosed herein.

A lamp control module according to an embodiment is used for a vehicle lamp provided with a turn signal lamp, a daytime running lamp, and a position lamp. The lamp control module includes a first driving circuit that drives a first light source which is the turn signal lamp, a second driving circuit that drives a second light source which is used as both the daytime running lamp and the position lamp, an input interface circuit that receives a turn synchronization signal for instructing a blinking of the turn signal lamp, a bus interface circuit that receives a first switch-on request for instructing switch-on/off of the daytime running lamp and a second switch-on request for instructing switch-on/off of the position lamp, and a signal processing device that executes a software program to control the first driving circuit and the second driving circuit based on the turn synchronization signal, the first switch-on request, and the second switch-on request.

According to this configuration, the single signal processing device collectively processes the states of the multiple light sources with software, so that the multiple light sources may be switched on to be brought into appropriate states according to the states of the multiple switch-on requests. In particular, when the instructions to switch on the daytime running lamp and the position lamp are made at the same time (competition), the switch-on state of the second light source may be arbitrarily set.

The signal processing device may generate a turn switch-on request that becomes a first level in a switch-on instruction state where the turn synchronization signal is a pulse form, and becomes a second level in a switch-off instruction state where the level of the turn synchronization signal is fixed. The signal processing device may control the first driving circuit based on the turn switch-on request and the turn synchronization signal, and may control the second driving circuit based on the turn switch-on request, the turn synchronization signal, the first switch-on request, and the second switch-on request.

The signal processing device may refer to a table in which the turn switch-on request, the turn synchronization signal, the first switch-on request, and the second switch-on request are inputs, and the state of the second light source is an output, and control the second driving circuit based on the table. By changing the table without changing the software program, the specification of the vehicle lamp may be changed to a specification suitable for a specific country or region. As a result, the time period and costs for developing headlamps may be reduced.

The lamp control module may further include a programmable nonvolatile memory that stores the table, in an aspect independent from the software program. By simply rewriting the table, the specification of the vehicle lamp may be changed to a specification suitable for various countries or regions. Further, the nonvolatile memory may be mounted in the signal processing device, or may be mounted outside the signal processing device.

The second driving circuit may be capable of designating the following three states: (i) a state where the output current thereof is zero, (ii) a state where the output current thereof is relatively small, and (iii) a state where the output current thereof is relatively large.

The signal processing device according to an embodiment is used for the vehicle lamp provided with the turn signal lamp, the daytime running lamp, and the position lamp. The turn signal lamp is configured to include the first light source, and the daytime running lamp and the position lamp are configured to share the second light source. By executing the software program, the signal processing device executes (i) a process of generating the turn switch-on request that becomes the first level in the blinking instruction state where the turn synchronization signal is a pulse form, and becomes the second level in the switch-off instruction state where the level of the turn synchronization signal is fixed, (ii) a process of controlling the state of the first light source based on the turn synchronization signal for instructing the blinking of the turn signal lamp, and (iii) a process of controlling the state of the second light source based on the turn switch-on request, the first switch-on request for instructing the switch-on/off of the daytime running lamp, and the second switch-on request for instructing the switch-on/off of the position lamp. The process of controlling the state of the second light source ((iii)) is executed based on the table in which the turn switch-on request, the level of the turn synchronization signal, the first switch-on request, and the second switch-on request are inputs, and the state of the second light source is an output.

According to the signal processing device, the specification of the vehicle lamp may be changed to a specification suitable for a specific country or region, by changing the table without changing the software program. As a result, the time period and costs for developing headlamps may be reduced.

The table may be stored in a programmable nonvolatile memory. By simply rewriting the table without changing the software program, the specification of the vehicle lamp may be changed to a specification suitable for various countries or regions.

The second light source may be capable of designating the following three states: (i) a switch-off state, (ii) a switch-on state with a relatively dark luminance, and (iii) a switch-on state with a relatively bright luminance.

Embodiments

Hereinafter, embodiments of the present disclosure will be described with reference to the drawings. In the respective drawings, similar or equivalent components, members, and processes will be denoted by the same reference numerals, and descriptions thereof will be appropriately omitted. Further, the embodiments merely provide examples of the present disclosure without limiting the present disclosure, and all features or combinations thereof described in the embodiments may not be necessarily required for the present disclosure.

In the descriptions herein, a "state where a member A is connected to a member B" includes not only a state where the members A and B are physically directly connected to each other, but also a state where the members A and B are indirectly connected to each other via another member that does not substantially affect the electrical connection of the members A and B or does not damage functions or effects achieved by the connection of the members A and B.

Similarly, a "state where a member C is provided between members A and B" includes not only a case where the members A and C or the members B and C are directly connected to each other, but also a case where the members A and C or the members B and C are indirectly connected to each other via another member that does not substantially affect the electrical connection of the members A and C or the members B and C, and does not damage functions or effects achieved by the connection of the members A and C or the members B and C.

Further, in the descriptions herein, reference numerals denoted for electric signals such as voltage signals and current signals, or circuit elements such as resistors and capacitors may represent voltage values, current values, resistance values, or capacity values of the electric signals or circuit elements, as necessary.

Figure 1:
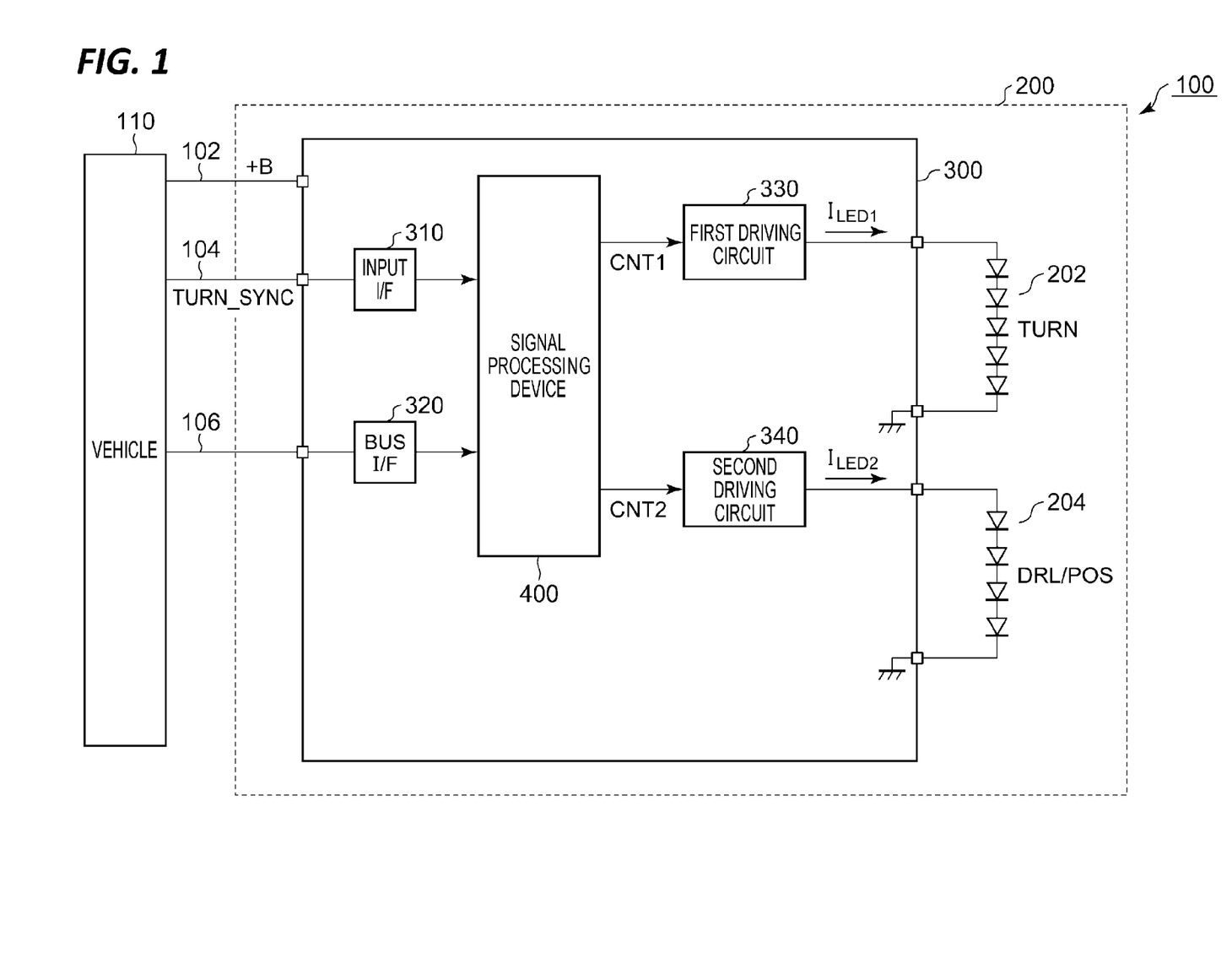
FIG. 1 is a block diagram of a lamp system according to an embodiment.

FIG. 1 is a block diagram of a lamp system 100 according to an embodiment. The lamp system 100 includes a vehicle 110 and a vehicle lamp (headlamp) 200. The vehicle 110 includes, for example, a vehicle-side electronic control unit (ECU), a battery, and a switch of each lamp.

The vehicle lamp 200 has functions of a low beam (Lo), a high beam (Hi), a daytime running lamp (DRL), a position lamp (POS), and a turn signal lamp (TURN). FIG. 1 illustrates only the configurations related to the DRL, the position lamp, and the turn signal lamp.

The vehicle lamp 200 includes a first light source 202, a second light source 204, and a lamp control module 300. The first light source 202 is used as the turn signal lamp, and the second light source 204 is used as both the DRL and the position lamp. Each of the first light source 202 and the second light source 204 may be configured by one semiconductor light source or a plurality of semiconductor light sources connected to each other in series and/or in parallel. Examples of the semiconductor light source include a white light emitting diode (LED), a laser diode, and an organic electro luminescence (EL) element. In FIG. 1, each of the first light source 202 and the second light source 204 is an LED bar (LED string) formed by connecting a plurality of LEDs to each other in series. The number of LEDs that make up the first light source 202 or the second light source 204 may be determined in consideration of required brightness or design, and is not particularly limited.

A power supply voltage +B is supplied from the vehicle 110 to the vehicle lamp 200 through a power supply line 102. Further, a turn synchronization signal TURN_SYNC is input from the vehicle 110 to the vehicle lamp 200 through a zika line 104. The turn synchronization signal TURN_SYNC is a signal for instructing the blinking of the turn signal lamp. During the blinking of the turn signal lamp, the turn synchronization signal TURN_SYNC becomes a pulse signal in which a high level and a low level are alternately repeated in a predetermined cycle, and the high section and the low section are associated with switch-on and switch-off, respectively. In the non-blinking state (switch-off state) of the turn signal lamp, the turn synchronization signal TURN_SYNC is fixed to the low level.

Further, a first switch-on request REQ_DRL for instructing the switch-on/off of the DRL and a second switch-on request REQ_POS for instructing the switch-on/off of the position lamp are supplied from the vehicle 110 to the vehicle lamp 200 though a vehicle bus 106. The type of the vehicle bus is not particularly limited, and for example, a controller area network (CAN) or a local interconnect network (LIN) may be used.

The lamp control module 300 includes an input interface circuit 310, a bus interface circuit 320, a first driving circuit 330, a second driving circuit 340, and a signal processing device 400.

The input interface circuit 310 receives the turn synchronization signal TURN_SYNC. The input interface circuit 310 may be simply a buffer, and shapes the turn synchronization signal TURN_SYNC.

The bus interface circuit 320 is a transceiver capable of performing a bidirectional communication with the vehicle 110 via the vehicle bus 106. Data received by the bus interface circuit 320 include the first switch-on request REQ_DRL and the second switch-on request REQ_POS.

The first driving circuit 330 drives the first light source 202. For example, the first driving circuit 330 has a constant current output, and supplies a driving current $I_{LED1}$ that corresponds to a target luminance, to the first light source 202. During the turn blinking, the driving current $I_{LED1}$ becomes an intermittent current that corresponds to the turn synchronization signal TURN_SYNC.

The second driving circuit 340 drives the second light source 204. For example, the second driving circuit 340 has a constant current output, and supplies a driving current $I_{LED2}$ that corresponds to a target luminance, to the second light source 204. As described above, since the second light source 204 serves as both the DRL and the position lamp, the second light source 204 emits light with a relatively high luminance when the DRL is switched on, and emits light with a relatively low luminance when the position lamp is switched on. Thus, the driving current $I_{LED2}$ generated by the second driving circuit 340 changes according to the switch-on mode of the second light source 204. Specifically, when the DRL is switched on, the driving current $I_{LED2}$ is relatively large, and when the position lamp is switched on, the driving current $I_{LED2}$ is relatively small.

The signal processing device 400 includes a processor capable of executing the software program. The signal processing device 400 may be configured by, for example, a microcontroller, a central processing unit (CPU), or a digital signal processor (DSP).

The signal processing device 400 controls the first driving circuit 330 and the second driving circuit 340, based on the turn synchronization signal TURN_SYNC, the first switch-on request REQ_DRL, and the second switch-on request REQ_POS.

The signal processing device 400 executes the following processes according to the software program.

Process 1. The signal processing device 400 generates the turn switch-on request REC_TURN based on the turn synchronization signal TURN_SYNC. The turn switch-on request REC_TURN becomes the first level (e.g., high) in the blinking instruction state where the turn synchronization signal TURN_SYNC is a pulse form, and becomes the second level (e.g., low) in the switch-off instruction state where the turn synchronization signal TURN_SYNC remains low.

Process 2. The signal processing device 400 generates first control signals CNT1 based on the turn switch-on request REC_TURN and the turn synchronization signal TURN_SYNC, to control the first driving circuit 330. Specifically, the signal processing device 400 causes the first driving circuit 330 to generate the pulse-shaped driving current $I_{LED1}$, during the time period when the turn switch-on request REC_TURN is the first level, in synchronization with the turn synchronization signal TURN_SYNC.

Process 3. The signal processing device 400 generates second control signals CNT2 based on the turn switch-on request REC_TURN, the turn synchronization signal TURN_SYNC, the first switch-on request REQ_DRL, and the second switch-on request REQ_POS, to control the second driving circuit 340. Specifically, the signal processing device 400 controls the driving current $I_{LED2}$ generated by the second driving circuit 340.

Figure 2:
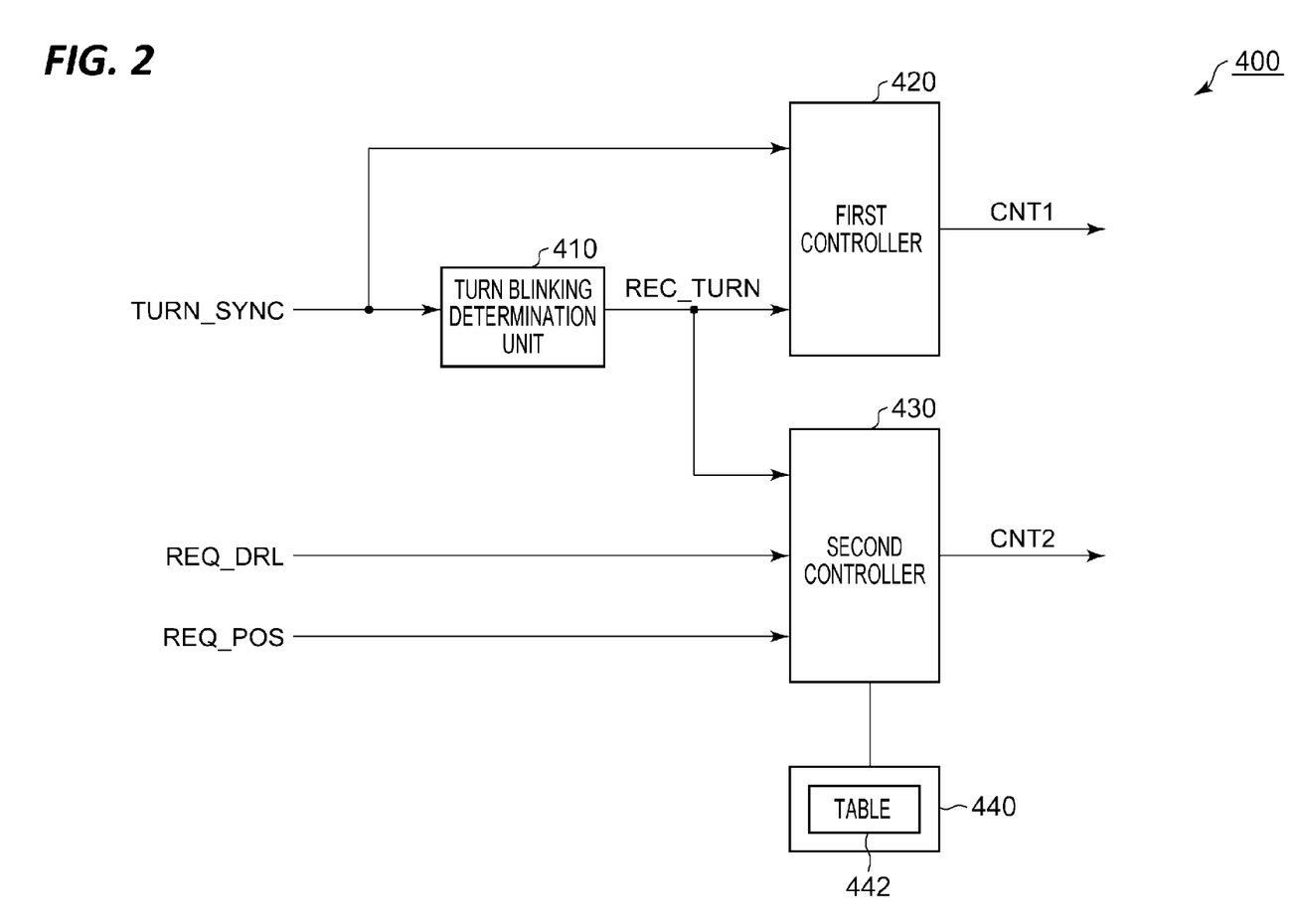
FIG. 2 is a functional block diagram of a signal processing device.

FIG. 2 is a functional block diagram of the signal processing device 400. The signal processing device 400 includes a turn blinking determination unit 410, a first controller 420, a second controller 430, and a nonvolatile memory 440.

The turn blinking determination unit 410, the first controller 420, and the second controller 430 represent functions implemented when the processor of the signal processing device 400 executes the software program, and execute Processes 1, 2, and 3 described above, respectively.

The process of generating the turn switch-on request REC_TURN in the turn blinking determination unit 410 may be performed outside the signal processing device 400.

Process 3 is performed by the second controller 430 with reference to a table 442. In the table 442, the turn switch-on request REC_TURN, the turn synchronization signal TURN_SYNC, the first switch-on request REQ_DRL, and the second switch-on request REQ_POS are inputs, and the state of the second light source 204 is an output.

The table 442 is stored in the programmable nonvolatile memory 440. The table 442 may be separated from the software program executed by the signal processing device 400, and may be independently changeable as an external parameter. The nonvolatile memory 440 may be mounted in the signal processing device 400, or may be attached to the outside of the signal processing device 400.

Figure 3:
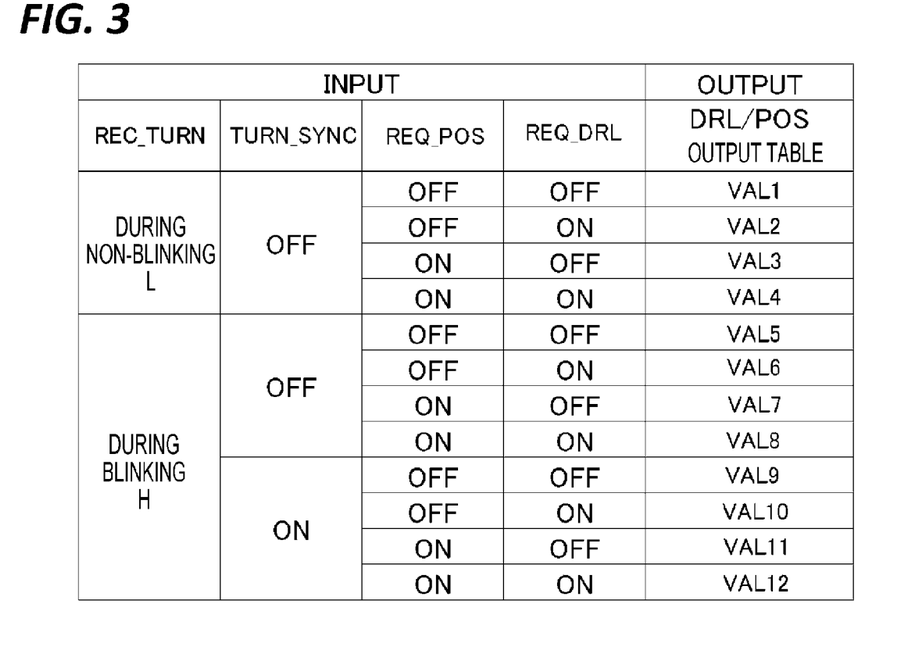
FIG. 3 is a view illustrating a table used for a process of adjusting a daytime running lamp and a position lamp.

FIG. 3 is a view illustrating the table 442 used for the process of adjusting the DRL and the position lamp. There exist a total of 12 input states (combinations of values of the turn switch-on request REC_TURN, the turn synchronization signal TURN_SYNC, the first switch-on request REQ_DRL, and the second switch-on request REQ_POS). Accordingly, the table 442 includes 12 values VAL1 to VAL12 that correspond to the 12 input states.

Figure 4:
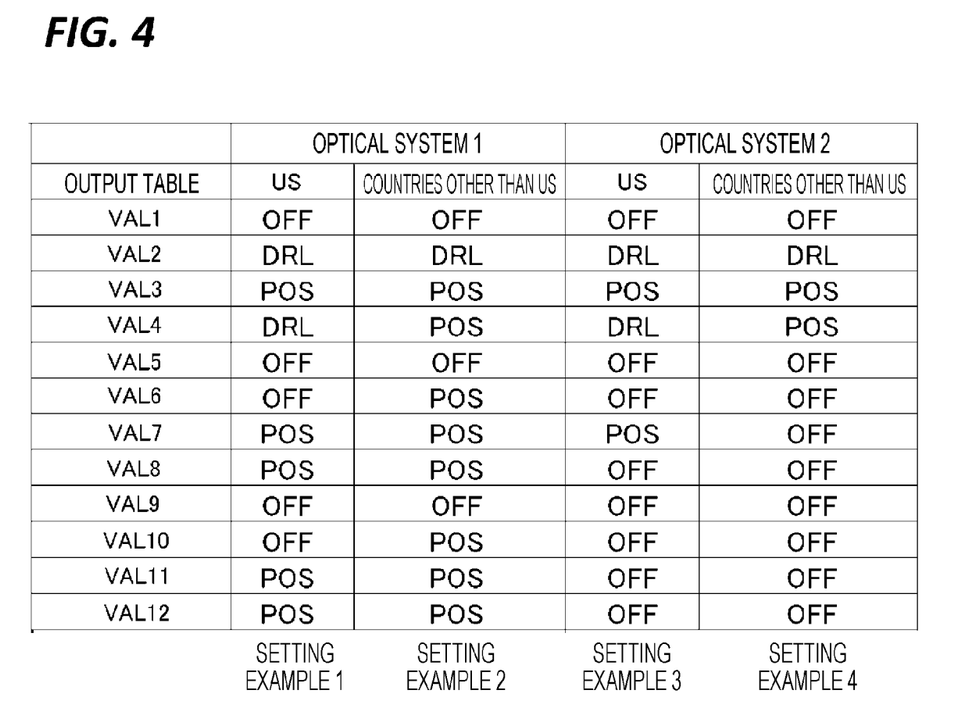
FIG. 4 is a view illustrating setting examples of a table.

FIG. 4 is a view illustrating setting examples of the table. The output value VAL may be associated with the light emission luminance of the second light source 204 in each input state, that is, may be associated with the output current $I_{LED2}$ of the second driving circuit 340. In the examples, the output value VAL may be set to one of three values (OFF, POS, and DRL). The second light source 204 is switched off when VAL=OFF, emits light with a relatively low luminance when VAL=POS, and emits light with a relatively high luminance when VAL=DRL.

In view of the relationship between the value VAL and the driving current $I_{LED2}$, $I_{LED2}=0$ A when VAL=OFF, $I_{LED2}=I_1$ when VAL=POS, and $I_{LED2}=I_2$ ($>I_1$) when VAL=DRL. In addition, when the second driving circuit 340 is capable of performing a pulse-width modulation (PWM) dimming for the second light source 204, $I_1$ and $I_2$ are associated with an average value of the driving currents $I_{LED2}$.

For example, when a vehicle lamp 200 provided with Optical System 1 (or a certain function) is used in the United States (US), Setting Example 1 is set, and when the same vehicle lamp 200 is used in countries other than the US, Setting Example 2 is set. Further, when a vehicle lamp 200 provided with another Optical System 2 (or another function) is used in the US, Setting Example 3 is set, and when the same vehicle lamp 200 is used in countries other than the US, Setting Example 4 is set. By rewriting the values in the table in this way, it becomes possible to respond to different optical systems and different countries or regions.

The configuration of the vehicle lamp 200 has been described. According to the vehicle lamp 200, the single signal processing device collectively processes the states of the plurality of light sources by software, so that the plurality of light sources may be switched on to be brought into appropriate states according to the states of the plurality of switch-on requests. In particular, when the switch-on requests for the DRL and the position lamp occur at the same time (competition), the switch-on state of the second light source 204 may be arbitrarily set.

Subsequently, an example of a more specific configuration of the vehicle lamp 200 will be described.

Figure 5:
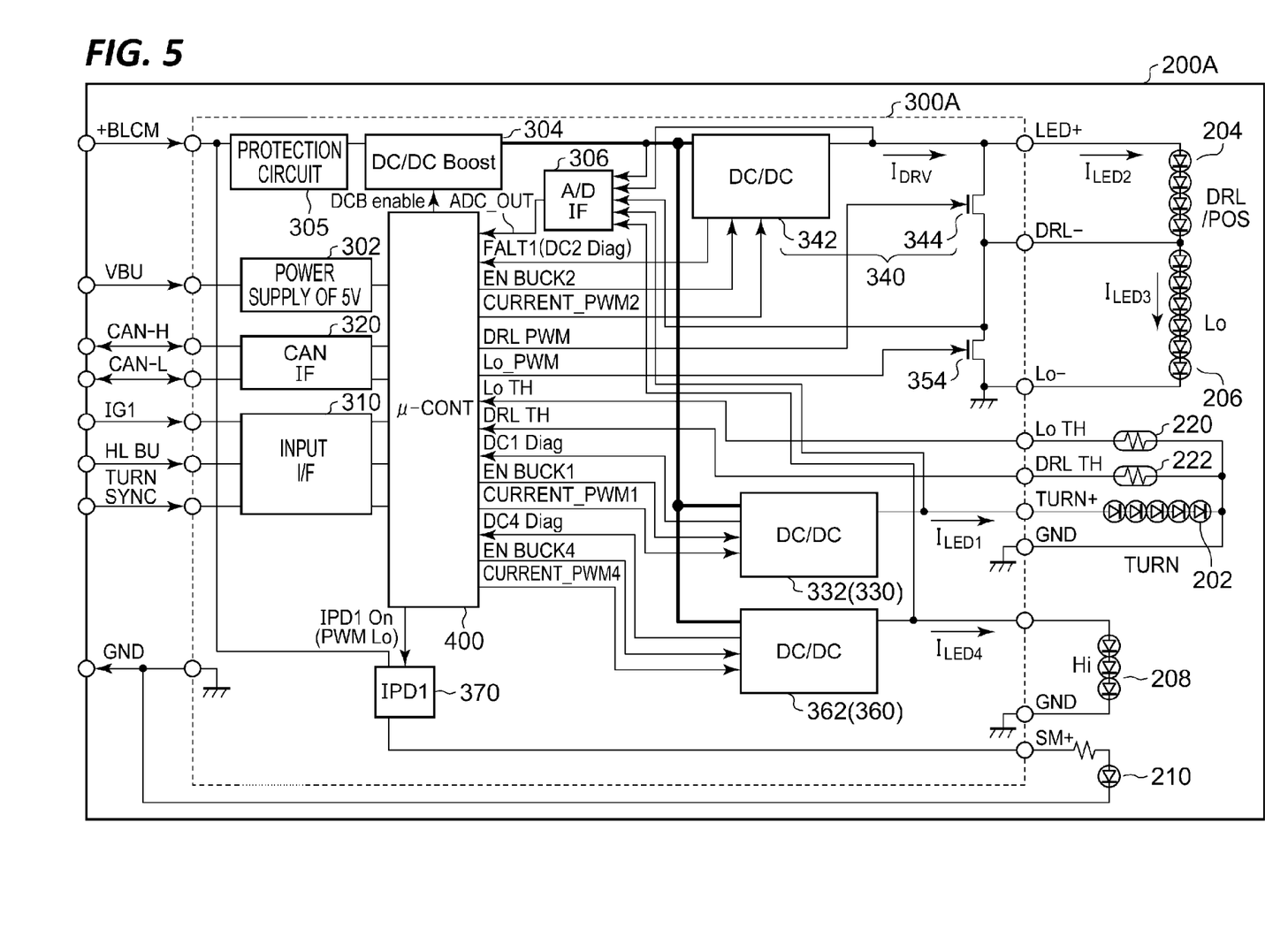
FIG. 5 is a block diagram illustrating an example of a specific configuration of a vehicle lamp.

FIG. 5 is a block diagram illustrating an example of a specific configuration of a vehicle lamp 200A. The vehicle lamp 200A includes a lamp control module 300A and a first light source 202 to a fifth light source 210. As described above, the first light source 202 is used for the turn signal lamp, and the second light source 204 is used for both the DRL and the position lamp. The third light source 206 is used for a low beam, the fourth light source 208 is used for a high beam, and the fifth light source 210 is a light source for a side marker.

The voltage or signal applied to the vehicle lamp 200A will be described.

+BLCM: Battery power supply (12 V or 24 V) which is used as the main power supply of the vehicle lamp 200A.

IG1: Ignition power supply which is supplied to a digital system.

+VBU: Backup power supply which is bridged with the IG1 in a circuit and supplied to the digital system. A power supply voltage based on the VBU is supplied to a microcontroller. During the vehicle transportation, the backup power supply VBU is turned OFF in principle unless ignition-ON is performed, so that the power consumption is suppressed.

CAN-H, CAN-L: Vehicle bus

HL_BU: Headlamp backup. Even in a case where a CAN signal is interrupted, HL_BU is supplied through the zika line in order to control the low beam. That is, the low beam is turned ON by a logical sum of low beam switch-on signals of the HL_BU and the CAN signal.

TURN_SYNC: Turn synchronization signal.

A power supply circuit 302 receives the voltage VBU and generates a power supply voltage $V_{DD}$ of about 5 V. The power supply voltage $V_{DD}$ is supplied to the signal processing device 400 or other circuits.

A protection circuit 305 includes, for example, a diode for preventing a reverse connection or a Zener diode for a surge countermeasure, so as to protect the vehicle lamp 200A from the main power supply voltage +BLCM.

A power supply circuit 304 is a step-up DC/DC converter, and boosts the power supply voltage +BLCM from the vehicle to generate a high voltage $V_H$ of, for example, about 40 V.

Thermistors 220 and 222 are provided to monitor the temperatures of the third light source 206 and the second light source 204.

An A/D converter 306 converts the voltage or current of the plurality of nodes in the lamp control module 300A, and the voltages of the thermistors into digital signals. An output ADC_OUT of the A/D converter 306 is supplied to the signal processing device 400.

(Turn Signal Lamp)

The first driving circuit 330 includes a step-down DC/DC converter 332 having a constant current output, to generate the driving current $I_{LED1}$. An enable signal EN_BUCK1 and a dimming signal CURRENT_PWM1 are supplied as the control signals CNT1 to the step-down DC/DC converter 332. The step-down DC/DC converter 332 enters the operation state when the enable signal EN_BUCK1 is asserted (e.g., high), and generates the driving current $I_{LED1}$ having a current amount that corresponds to the dimming signal CURRENT_PWM1. The dimming signal CURRENT_PWM1 is a PWM signal, and a controller IC of the step-down DC/DC converter 332 detects the duty cycle of the dimming signal CURRENT_PWM1, and changes the current amount of the driving current $I_{LED1}$ according to the duty cycle (analog dimming) In order to blink the first light source 202 as described above, the signal processing device 400 switches the enable signal EN_BUCK1 in response to the turn synchronization signal TURN_SYNC.

The DC/DC converter 332 transmits fail information or diagnosis information DC1_Diag to the signal processing device 400.

(DRL and Position Lamp)

In the present embodiment, the second light source 204 and the third light source 206 are connected to each other in series. The light sources 204 and 206 are driven by the common step-down DC/DC converter 342 and two bypass switches 344 and 354. The second light source 204 is driven by the second driving circuit 340 which is a combination of the step-down DC/DC converter 342 and the bypass switch 344.

An enable signal EN_BUCK2 and a dimming signal CURRENT_PWM2 which are supplied to the step-down DC/DC converter 342, and a PWM signal DRL_PWM supplied to the bypass switch 344 correspond to the control signals CNT2 described above.

The step-down DC/DC converter 342 enters the operation state when the enable signal EN_BUCK2 is asserted (e.g., high), and generates a driving current $I_{DRV}$ having a current amount that corresponds to the dimming signal CURRENT_PWM2. The dimming signal CURRENT_PWM2 is a PWM signal, and a controller IC of the step-down DC/DC converter 342 changes the current amount of the driving current $I_{DRV}$ according to the duty cycle of the dimming signal CURRENT_PWM2 (analog dimming).

ON/OFF of the bypass switch 344 are controlled by the PWM signal DRL_PWM. The driving current $I_{DRV}$ is supplied to the second light source 204 during the OFF of the bypass switch 344, and is not supplied to the second light source 204 during the ON of the bypass switch 344. By changing the PWM signal DRL_PWM, the signal processing device 400 may change the average value of the drive current $I_{LED2}$ supplied to the second light source 204, and change the effective luminance of the second light source 204.

For example, the signal processing device 400 changes the luminance of the second light source 204 by changing the duty cycle of the PWM signal DRL_PWM according to the values VAL of the table, thereby switching the functions of the DRL and the position lamp.

(Low Beam)

The combination of the step-down DC/DC converter 342 and the bypass switch 354 is regarded as a third driving circuit 350 that drives the third light source 206. ON/OFF of the bypass switch 354 are controlled according to a Lo_PWM signal.

The DC/DC converter 342 transmits fail information or diagnosis information DC2_Diag to the signal processing device 400.

(High Beam)

A fourth driving circuit 360 that drives the fourth light source 208 includes a step-down DC/DC converter 362. The step-down DC/DC converter 362 enters the operation state when an enable signal EN_BUCK3 is asserted (e.g., high), and generates a driving current $I_{LED4}$ having a current amount that corresponds to a dimming signal CURRENT_PWM4. The dimming signal CURRENT_PWM4 is a PWM signal, and a controller IC of the step-down DC/DC converter 362 changes the current amount of the driving current $I_{LED4}$ according to the duty cycle of the dimming signal CURRENT_PWM4 (analog dimming).

The high beam may be an adaptive driving beam (ADB) lamp. In this case, a plurality of LEDs that make up the fourth light source 208 for the high beam may be configured such that ON/OFF of the LEDs are individually controllable. Specifically, a bypass switch may be provided for each LED chip, and may be controlled such that a bypass switch parallel to an LED corresponding to a light-shielded region is turned ON.

(Side Marker)

ON/OFF of a fifth driving circuit 370 are controlled according to a control signal IPD1_On. In the ON state, the fifth driving circuit 370 supplies a driving current $I_{LED5}$ to the fifth light source 210 so as to switch on the fifth light source 210. The control signal IPD1_On is a PWM signal, and the driving current $I_{LED5}$ is switched according to the duty cycle of the control signal IPD1_On, so that the luminance of the fifth light source 210 is adjusted.

The present disclosure has been described based on the embodiments. The embodiments are merely examples, and one skilled in the art may understand that various modifications may be made to the combinations of the respective components or processes of the embodiments, and the modifications also fall within the scope of the present disclosure. Hereinafter, the modifications will be described.

(Modification 1)

In the embodiments, the luminance of the DRL/POS may be set to three steps (zero, low brightness, and high brightness). However, without being limited thereto, the luminance may be set to three or more steps.

(Modification 2)

In the vehicle lamp 200A of FIG. 5, the power supply circuit 304 may be omitted, and the DC/DC converters 342, 332, and 352 may be configured to function as the boosting converters.

(Modification 3)

Further, the second light source 204 and the third light source 206 are driven by a common converter. However, without being limited thereto, the second light source 204 and the third light source 206 may be driven by separate converters.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A lamp control module used for a vehicle lamp comprising:
   a first driving circuit configured to drive a first light source that serves as a turn signal lamp of the vehicle lamp;
   a second driving circuit configured to drive a second light source that serves as both a daytime running lamp and a position lamp of the vehicle lamp;
   an input interface circuit configured to receive a turn synchronization signal for instructing a blinking of the turn signal lamp;
   a bus interface circuit configured to receive a first switch-on request for instructing switch-on/off of the daytime running lamp and a second switch-on request for instructing switch-on/off of the position lamp; and
   a signal processing device configured to execute a software program to control the first driving circuit based on the turn synchronization signal, and control the second driving circuit based on the first switch-on request and the second switch-on request, thereby driving the first light source and the second light source, respectively.

2. The lamp control module according to claim 1, wherein the signal processing device is configured to:
generate a turn switch-on request that becomes a first level in a blinking instruction state where the turn synchronization signal is a pulse form, and becomes a second level in a switch-off instruction state where a level of the turn synchronization signal is fixed,
control the first driving circuit based on the turn switch-on request and the turn synchronization signal, and
control the second driving circuit based on the turn switch-on request, the turn synchronization signal, the first switch-on request, and the second switch-on request.

3. The lamp control module according to claim 2, wherein the signal processing device refers to a table in which the turn switch-on request, the turn synchronization signal, the first switch-on request, and the second switch-on request are inputs, and a state of the second light source is an output, to control the second driving circuit based on the table.

4. The lamp control module according to claim 3, further comprising:
a programmable nonvolatile memory configured to store the table and independently provided from the software program.

5. The lamp control module according to claim 3, wherein the second driving circuit is able to designate three states that include (i) a state where an output current of the second driving circuit is zero, (ii) a state where the output current of the second driving circuit is relatively small, and (iii) a state where the output current of the second driving circuit is relatively large.

6. The lamp control module according to claim 4, wherein the second driving circuit is able to designate three states that include (i) a state where an output current of the second driving circuit is zero, (ii) a state where the output current of the second driving circuit is relatively small, and (iii) a state where the output current of the second driving circuit is relatively large.

7. A vehicle lamp comprising:
a first light source that is a turn signal lamp;
a second light source that serves as both a daytime running lamp and a position lamp; and
the lamp control module of claim 1 configured to drive the first light source and the second light source.

8. A signal processing device used for a vehicle lamp, wherein a turn signal lamp of the vehicle lamp includes a first light source, and a daytime running lamp and a position lamp of the vehicle lamp share a second light source,
the signal processing device executes a software program to perform:
generating a turn switch-on request that becomes a first level in a blinking instruction state where a turn synchronization signal is a pulse form, and becomes a second level in a switch-off instruction state where a level of the turn synchronization signal is fixed, and
controlling a state of the first light source based on the turn synchronization signal for instructing a blinking of the turn signal lamp, and controlling a state of the second light source based on the turn switch-on request, a first switch-on request for instructing switch-on/off of the daytime running lamp, and a second switch-on request for instructing switch-on/off of the position lamp, thereby driving the first light source and the second light source, respectively,
the controlling the state of the second light source is performed based on a table in which the turn switch-on request, the turn synchronization signal, the first switch-on request, and the second switch-on request are inputs, and a state of the second light source is an output.

9. The signal processing device according to claim 8, wherein the table is stored in a programmable nonvolatile memory.

10. The signal processing device according to claim 8, wherein the second light source is able to designate three states that include (i) a state where the second light source is switched off, (ii) a state where the second light source is switched on with a relatively dark luminance, and (iii) a state where the second driving circuit is switched on with a relatively bright luminance.

11. The signal processing device according to claim 9, wherein the second light source is able to designate three states that include (i) a state where the second light source is switched off, (ii) a state where the second light source is switched on with a relatively dark luminance, and (iii) a state where the second driving circuit is switched on with a relatively bright luminance.

12. The lamp control module according to claim 1, wherein the second light source emits light with a relatively high luminance while serving as the daytime running lamp, and emits light with a relatively low luminance while serving as the position lamp.

13. The signal processing device according to claim 8, wherein the second light source emits light with a relatively high luminance while serving as the daytime running lamp, and emits light with a relatively low luminance while serving as the position lamp.

* * * * *